United States Patent [19]

van Langen

[11] Patent Number: 4,579,588
[45] Date of Patent: Apr. 1, 1986

[54] METHOD FOR THE PRODUCTION OF LIQUID IRON FROM IRON OXIDE

[75] Inventor: Jean M. van Langen, Akersloot, Netherlands

[73] Assignee: Hoogovens Groep B.V., Ijmuiden, Netherlands

[21] Appl. No.: 714,350

[22] Filed: Mar. 21, 1985

Related U.S. Application Data

[63] Continuation of Ser. No. 491,726, May 5, 1983, abandoned.

[30] Foreign Application Priority Data

May 12, 1982 [NL] Netherlands .................. 8201945

[51] Int. Cl.$^4$ ............................................. C21B 13/06
[52] U.S. Cl. ........................................ 75/35; 75/38; 75/40; 48/92
[58] Field of Search ............... 75/38, 40, 34, 35; 48/92

[56] References Cited

U.S. PATENT DOCUMENTS

| | | | |
|---|---|---|---|
| 2,750,278 | 6/1956 | Morvay ............................... | 75/40 |
| 3,853,538 | 12/1974 | Nemeth ............................... | 75/35 |
| 4,007,034 | 2/1977 | Hartwig et al. ..................... | 75/38 |
| 4,111,687 | 9/1978 | Syska .................................. | 75/13 |
| 4,248,626 | 2/1981 | Scarlett et al. ...................... | 75/38 |
| 4,316,739 | 2/1982 | Beggs et al. ........................ | 75/40 |
| 4,396,421 | 8/1983 | Stift et al. ........................... | 75/26 |
| 4,409,023 | 10/1983 | Weber et al. ........................ | 75/38 |
| 4,459,137 | 7/1984 | Tanoue et al. ...................... | 48/92 |

FOREIGN PATENT DOCUMENTS

| | | |
|---|---|---|
| 1293178 | 4/1969 | Fed. Rep. of Germany . |
| 1508013 | 6/1970 | Fed. Rep. of Germany . |
| 544759 | 9/1922 | France . |
| 2236951 | 2/1975 | France . |

Primary Examiner—Melvyn J. Andrews
Attorney, Agent, or Firm—Stevens, Davis, Miller & Mosher

[57] ABSTRACT

Method and apparatus for producing liquid iron from iron oxide, wherein the iron oxide is substantially converted to sponge iron by passing reducing gas through it in a reduction column and is then melted in a melt vessel which is in open communication with the reduction column by heat generated by reaction of oxygen-containing gas and carbonaceous material which reaction provides said reducing gas. To improve control of the process, the oxygen-containing gas and the carbonaceous material are respectively substantially pure oxygen and coal powder which are delivered separately into the melt vessel, and the liquid iron bath in the melt vessel is stirred so as at least partly to be kept in motion. By separate control of the oxygen and coal supplies, e.g. the level and/or direction of delivery, and by control of stirring, it is possible to control the ratio of CO and $CO_2$ in the reducing gas and also the heat output in the melt vessel.

6 Claims, 2 Drawing Figures

METHOD FOR THE PRODUCTION OF LIQUID IRON FROM IRON OXIDE

This application is a continuation of application Ser. No. 491,726 filed May 5, 1983, now abandoned.

BACKGROUND OF THE INVENTION

1. Field of the Invention

The invention relates to a method and apparatus for the production of liquid iron from iron oxide, wherein the iron ore oxide is reduced at least partly to sponge iron by a reducing gas in a reduction column, whereafter the sponge iron is melted in a melt vessel and then tapped, oxygen-containing gas and carbon-containing material being caused to react together in the melt vessel to generate the required melting heat and the said reducing gas.

2. Description of the Prior Art

The most commonly used method of producing liquid iron from iron ore is the blast furnace process. The resultant so-called pig iron contains approximately 4 to 5.5% carbon, together with amounts of silicon, sulphur, phosphorus and other desirable or undesirable elements, dependent on the operation of the blast furnace. These additives must be at least partly removed by means of a subsequent process in a steel furnace, if steel is to be produced from the pig iron.

The blast furnace process has several disadvantages. Firstly it is based on the use of coke, for which separate coking plants are required, and as a result of which the reduction process in the blast furnace requires the indirect use of high-quality, expensive coking coal. Secondly, the entire wall structure must be constructed for a high thermal load, which gives rise to complicated and expensive structures. Thirdly expensive blast pre-heating devices are employed. The high content of undesirable elements in the pig iron derived from a blast furnace should also be regarded as a disadvantage.

To overcome these disadvantages, processes have been proposed in which iron ore is converted to sponge iron at a lower temperature by means of reducing gases. This sponge iron is then melted further in an electric furnace, and converted to steel. In this process the reduced sponge iron is usually cooled, before feeding to the electric furnace. The associated heat losses affect the cost price of the final steel most unfavourably.

This process also suffers from the disadvantage that separate production of the necessary reducing gas is required. Moreover, the costs of electricity associated with the operation of an electric furnace often prevent economic application. DE-A-No. 2550761 describes an attempt made to overcome these difficulties. In this case, material containing carbon is fed into a melt vessel below the liquid level of an iron bath, causing the iron to be saturated and maintained with dissolved carbon. Sponge iron and/or iron oxide, together with oxygen, is blown on to the bath by means of a liquid-cooled lance. As a result of the reactions thereby initiated, carbon from the bath is converted with oxygen to CO gas, whilst the sponge iron is melted by the heat thereby released. If non-reduced oxide is also supplied, this is reduced by the carbon present in the bath. The CO gas formed is discharged and used elsewhere as a reducing gas for the formation of sponge iron from iron ore. After the level of the molten iron has risen above a certain point, iron can be tapped off. In this case, however, sufficient iron must remain to act as the reagent. The iron drained off is rich in carbon.

Others have more recently proposed processes in which the sponge iron is fed directly into a melt vessel which is located below the reduction column, and the reducing gas and the melting heat are produced by the reaction, in the melt vessel, of oxygen-containing gas and carbonaceous material which are fed into the melt vessel above the surface of the liquid iron bath therein. Examples of such proposals are U.S. Pat. Nos. 4,111,687, 4,248,626 and 4,316,739.

According to U.S. Pat. No. 4,111,687, the preferred fuels in the melt vessel are oxygen and natural gas. In this case, the melt vessel is in open communication with the reduction column. In U.S. Pat. No. 4,248,626 the use of powdered coal and oxygen is described, these being fed through injection pipes to above the liquid iron in the melt vessel, while in U.S. Pat. No. 4,316,739 powdered coal and oxygen are directed onto a pile of hot reduced iron pellets on a platform in the melt vessel. In both these last two proposals, the reducing gas produced in the melt vessel is taken off for separate treatment, before being fed into the reduction column.

SUMMARY OF THE INVENTION

The object of the present invention is to provide a method and apparatus for production of liquid iron from iron oxide, which uses a directly connected reduction column and melt vessel and in which appropriate fuels (in particular powdered coal and oxygen) are employed to produce the required reducing gas.

The present inventors have appreciated that there are defects in the above-described processes, in particular in the lack of control of the production of the reducing gas in the melt vessel, and in the processes of U.S. Pat. Nos. 4,248,626 and 4,316,739, in the need for pre-treatment of the reducing gas before it is fed to the reduction column.

The present invention provides a process in which coal powder and oxygen, which is substantially pure, are fed separately to above the liquid iron bath in the melt vessel and in which the liquid iron bath is stirred so that at least partly it is kept in motion. The reducing gas from the melt vessel passes directly into the reduction column.

Separate delivery of the oxygen and the coal powder, particularly via separate individually adjustable lances, is an important feature because it permits adjustment and control of the reactions taking place in the melt vessel to achieve a desired ratio of CO and $CO_2$ in the gas derived from the melt vessel, thus providing control both of the heating effect in the melt vessel and of the temperature of the reducing gas fed to the reduction column. Such control can be simply achieved by adjustment of the height and/or direction of delivery of one or both of the coal powder and the oxygen.

At least partial stirring of the liquid iron bath in the melt vessel is also an important feature because it too provides control of the reactions in the melt vessel. In general, the liquid iron bath is not homogeneous in content, but the reaction of C and CO takes place in the bath with the liquid iron acting as the reaction medium. Accordingly, stirring of the bath influences the C and CO contents in the bath, and thus influences the ratio of CO and $CO_2$ in the gas produced.

By these measures, it is possible to achieve much improved choice of the amount of energy used in the melting stage and the amount of energy used in the reduction stage, so that the rates of the reduction stage and the melting stage are better matched. In the invention, this can be achieved simply by control of lance position and degree of stirring.

Because of the open connection of reduction column and melt vessel, the sponge iron formed in the reduction column can be fed simply and directly into the melt vessel without complicated measures being necessary for this. Moreover, since the reducing gas can be fed through the open connection from the melt vessel directly to the reduction column, the apparatus may be designed in a simple structure as two interconnecting reactors.

Since the melt vessel and the reduction column may be functionally designed as a single structure, a further improvement in the process is possible, in that the oxide reduction and melting may take place at an excess pressure i.e. at a pressure above atmospheric pressure for which purpose an excess pressure of 0.1 to 2.6 kg/cm$^2$ is preferably maintained at the top of the reduction column. The ore supply and the tapping of iron may then take place periodically.

The technique of operating a blast furnace under excess pressure has been universally introduced. Suitable charging devices for supplying ore material, coke and additives to the furnace are generally well known, so that this technique can be applied without difficulty to the new process of the invention. The advantage which can be gained by operating the reduction column and melt vessel simultaneously under excess pressure, the reducing column and melt vessel being in open communication with each other, consists in that a considerable increase in production from the plant is possible, whilst in addition the excess pressure applied can also be used to control the reactions taking place in the reduction column and melt vessel. Due to the resistance to gas flow caused by the charge in the reduction column, the excess pressure prevailing in the melt vessel will be higher than the so-called top pressure at the top of the reduction column. But since the reducing column has no melting zone, unlike a blast furnace, the fall in pressure over the reducing column may in many cases be lower, in this process, than the fall in pressure over the height of a blast furnace. The periodic charging and tapping of the apparatus are techniques which are generally known from blast furnace operation. It is one of the particular attractions of the new process that when it is in operation, optimum use can be made of the structures and processes freely available from blast furnace technology.

It has appeared that the best results are obtained by using pure oxygen and hard coal (also known as pit coal) of low gas content. However, depending on the development of market prices, it is also possible that under certain circumstances bituminous coal will produce a more favourable result than the coal of low gas content. The coal should be blown in (injected) in the form of powder. The technique of injecting powder coal into furnaces, and the manufacture of pulverised coal suitable for this purpose, need not be explained in greater detail since these processes are generally well known and are generally applied.

Preferably there are a plurality of oxygen lances, which also act as the stirring means for producing the desired stirring effect in the liquid iron bath. In this case, a plurality of lances, three for example, should preferably be used which produce jets directed obliquely onto the bath, preferably with a tangential component with respect to a central point of the bath. Bath circulation and the desired degree of homogenization of the bath can thereby be achieved.

Sufficient circulation in the bath may additionally or alternatively be achieved by means of known methods such as by bubbling an inert gas through the bath or by electromagnetic agitation of the metal.

The lances may be water-cooled designs corresponding to the structures generally used in steel converters of the LD and LD-AC type. With an oxygen pressure of the order of 10 kg/cm$^2$ a reliable method is provided, comparable with the use of oxygen lances in steel converters. By also designing the lances so that they are individually adjustable longitudinally, with a gas-tight passage through the bath wall, the desired lance adjustment is possible, e.g. according to the nature and level of the bath content.

Above the bath a highly reducing gas is formed as a result of the reaction between oxygen and carbon, in the presence of liquid iron as the reaction medium. This gas consists mainly of CO and H$_2$ gas. The reaction heat generated is sufficient for melting, at a temperature of approx. 1500° C., the sponge iron supplied. In order to use the reducing gas produced for reducing iron ore, e.g. in the form of pellets, a temperature of approx. 900° C. is sufficient. At a higher temperature, in fact, the iron formed in the reducing column and/or the slag components present or formed there may melt, which is undesirable as far as the progress of the process is concerned.

In a preferred embodiment of the process, the reducing gas formed is cooled to a temperature of approx. 900° C. before being led into the reduction column. This can be achieved by conducting the reducing gas along cooled surfaces, but at least under certain conditions a process is preferable in which the top gas derived from the reducing column is at least partially depleted of carbon dioxide, then at least partially added to the reducing gas being fed into the reduction column to cool the reducing gas. This ensures that a high proportion of the remaining reducing capacity of the top gas is again available for the process. An added advantage of this process consists in that there is also a possibility of controlling the process by means of the greater or lesser return of top gas.

As a result of the return of top gas to the reducing column inlet, it may also be possible to reduce a larger quantity of iron ore than is consistent with the melting capacity of the melt vessel. In this case only a proportion of the reduced sponge iron need be supplied to the melt vessel, whilst the rest is discharged directly from the reducing column. It is noted that sponge iron can be further processed in other ways, e.g. in electric furnaces. However as discussed above, it is possible by the invention to obtain if desired a better matching of the rates of the reduction column and the melt vessel.

It is possible, however, to cool the reducing gas by injecting a coolant at the top of the melt vessel. This coolant may be water or steam, but it may also be a material with a C content (e.g. natural gas, oil or pulverised coal), whereby C0$_2$ and H$_2$O which may be present in small quantities in the reducing gas, are converted to CO and H$_2$ in an endothermic reaction, thereby increasing the calorific content of the reducing gas while cooling it.

In addition to the method described, the invention also provides apparatus for carrying out this method.

The apparatus of the invention comprises the following features, indiviudally or in a combination of two or more:

(a) there are separate feed means for the oxygen-containing gas and the carbonaceous material and there are stirring means (constituted for example by the oxygen lance(s)) for maintaining the liquid iron bath at least partly in motion, (b) a plurality of reduction columns are openly connected to the melt vessel for supply of reduced sponge iron thereto, (c) the reduction column has a cooled bottom element which forms a support for the filling of the column and which is spaced from the surrounding wall of the column by a slot for passage of the reduced iron towards the melt vessel, the periphery of the support element adjacent said slot corresponding in location approximately to the foot of the natural slope of the filling of the column, and there being pushing means for causing material of the filling to fall through the slot past the support element.

(d) means for removing the gas from the top of the reduction column which deliver the gas to separating means for at least partly removing carbon dioxide from the gas, and means for feeding the gas treated by the separating means into the reducing gas passing from the melt vessel into the reduction column.

Preferably the apparatus is adapted to operate at excess pressure (i.e. above atmospheric pressure).

It is important for the column of pellets in the reduction column to be well supported and also for the pellets reduced to the sponge iron to be controllable and able to be fed regularly to the melt vessel. Feature (c) above aims to achieve this. In this way the mass flow of sponge iron through the slot can be controlled and regulated. In particular, regular conveyance of sponge iron to and through the slot, and from there to the melt vessel, can be achieved if the bottom support element is substantially flat at its top surface, and tapers conically downwardly below, with an annular duct left free around it which duct discharges into the melt vessel. This also provides the possibility of allowing the walls of the annular duct to be formed by heat exchange pipes which in turn form part of a steam generating installation. Pipes in this connection may also be understood to mean radiating panels through which water flows, and similar known elements. These can sufficiently reduce the temperature of the reducing gas flowing through the duct, whilst the thermal energy thereby released can be advantageously used for conversion to steam. It is noted that steam can be usefully employed at many points in an iron and steel works.

Instead of, or in combination with, this method of cooling the reducing gas, it is also possible to provide the apparatus with feature (d) above.

BRIEF INTRODUCTION OF THE DRAWINGS

The preferred embodiment of the invention will now be described by way of non-limitative example with reference to the accompanying drawings, in which.

Figure 2:
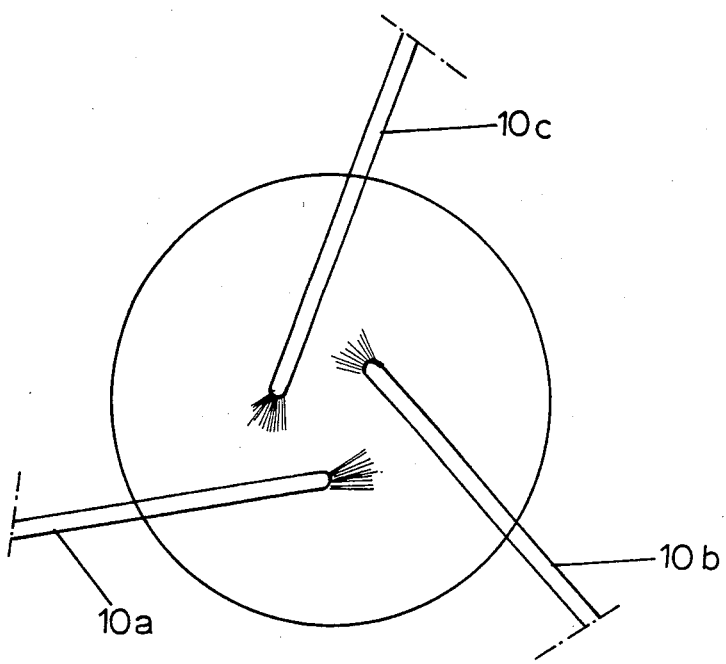
FIG. 2 is a horizontal section on the line II—II of FIG. 1.

FIG. 2 shows the wall 1 of a reduction column, which has a lower downward tapering wall section 2 and is terminated at its upper end by a (diagrammatically represented) top structure 3 of the type with two movable so-called bells or cones normally found in blast furnace structures. The reduction column is charged through this top structure 3 with pellets 4, consisting mainly of iron oxide.

The reduction column is in open connection at its lower end with a melt vessel 5, which is provided with a hearth structure 6 having therein a tap hole 7. The hearth structure 6, with tap hole 7 is also in principle of a design normally found in blast furnaces. A quantity of liquid iron 8 forming a bath in the hearth, with a layer of slag 9 above it, is shown diagrammatically.

Figure 1:
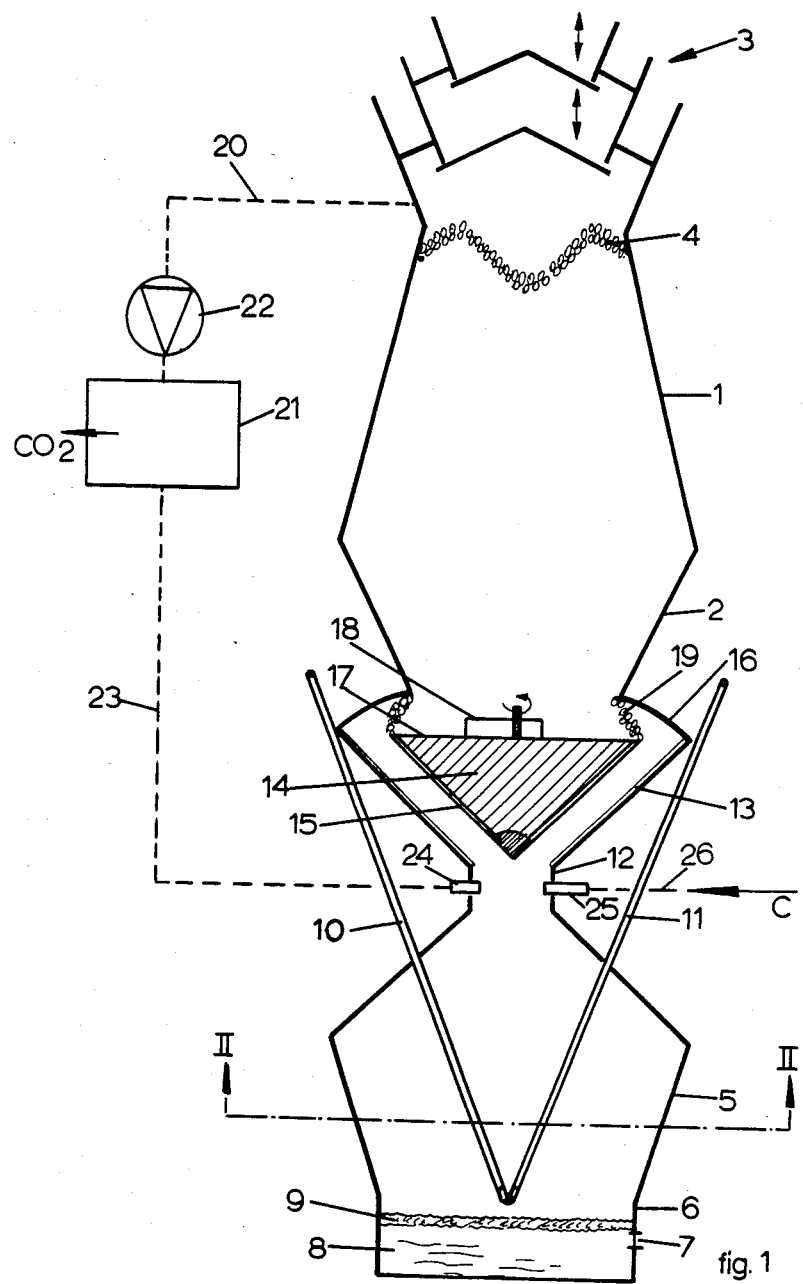
FIG. 1 shows diagrammatically the embodiment of the apparatus according to the invention in vertical section.

A plurality of lances discharge above the bath. FIG. 1 shows, for clarity, only two lances 10 and 11, which are connected to supply pipes (not shown) for oxygen and pulverized coal respectively. The lances 10,11 are mutually independently adjustable both as to height and direction of their output jets. Thus by suitable adjustment, the reactions taking place in and above the bath 8 can be controlled as described above. FIG. 2 shows that there are three oxygen lances $10a, 10b, 10c$ as more fully discussed below. The lance 11 is adapted for supplying pulverized coal by the use of a current of inert gas.

It is noted that, in the case illustrated, one reduction column is mounted above one melt vessel, but it is also feasible to install one or more reduction columns displaced horizontally and in parallel above the melt vessel. In this case the melt vessel can be provided with lances discharging vertically and centrally into the melt vessel.

The gas formed above the bath consists mainly of CO, and also contains hydrogen and a small proportion of carbon dioxide and water vapour. This gas is ideal to serve as reducing gas for the pellets in the reducing column 1.

At the top, the melt vessel 5 narrows to a passage 12, which is connected by an annular duct and an annular slot, formed by a bottom support element 14 in the form of an inverted cone, to the reduction space in the column 1. The annular duct is bounded by nests of heat-exchanging steam pipes 13 and 15, at the inner and outer sides respectively. In this case the nest of pipes 15 acts as a cooling screen for an inverted conical body 14, which with a flat upper face 17 forms the base for the mass of pellets 4 in the reducing column 1. The wall 2 of the reduction column connects into a downwardly widening wall section 16, which at its underside forms the annular slot with the conical body 14. The location and angle of the wall section 16 is chosen so that the mass of reduced pellets can form a natural or free slope 19, whose bottom edge coincides with the outer edge of the flat face 17 of the conical body 14.

The steam pipes 13 and 15 are connected to a water and steam circulation system (not shown), which forms part of a steam generating plant. Since steam boilers are generally sufficiently well known, the rest of this steam generation plant is not described in greater detail.

A pushing device 18 is rotatably installed above the flat upper face 17 of the conical body 14. This pushing device can be caused to rotate from outside the installation (see arrow). A cooling system may be provided for this pushing device, although structures are possible where this cooling system can be omitted. The pushing device 18 is in the form of a spiral to create an outward pushing effect, during rotation, which pushes the bottom layer of the pellets reduced to sponge iron over the edge of the flat face 17, so that the pellets are fed through into the melt vessel through the annular duct between the nests of steam pipes 13 and 15.

The heat generated when the pulverized coal is burnt in the melt vessel to form CO gas is sufficient to melt the sponge iron supplied. When the bath level has reached a critical height in the melt vessel, tap hole 7 can be opened, and iron and optionally slag is tapped.

An optional addition to the apparatus is shown diagrammatically and partially by broken lines. This consists essentially of a pipe 20 through which top gas can be fed from the reducing column, by way of a fan 22, to a separation plant 21, where $CO_2$ is separated. The residual gas, which consists mainly of unused reducing gas, can be returned through an injection nozzle 24 into the feed opening 12 of the melt vessel, through a pipe 23. There this top gas is mixed with the reducing gas formed in the melt vessel thereby lowering the temperature of this reducing gas. A supply pipe for feeding a coolant through an injection nozzle 25 into the rising current of reducing gas is denoted by reference number 26. As described above, this coolant may consist, for example of water, steam, natural gas, oil or pulverized coal.

With the present invention, as a result of the control of the conversion of pulverized coal to reducing gas in and above the bath 8, the carbon content of the molten iron may be lower than is normal in the blast furnace process. At a bath temperature of 1500° C. the process itself can be adjusted so that the iron formed contains only approximately 2% C and no Si, although the most favourable operating conditions must be determined for individual cases.

The following production figures are therefore taken, for example, for the production of 1000 kg Fe in pig iron:

anthracite required (10% ash) 640 kg
oxygen required 440 $Nm^2$
oxide pellets required 1625 kg
steam generated, 600 kg
slag formed, 200 kg.

A further quantity of combustible residual gas, with a composition of 45% CO, 45% $CO_2$, 10% $H_2$, is also formed, with a total calorific content of 8 GJ.

If the diameter of the hearth 6 is approximately 6 m, a daily pig iron production of approx. 1000 tonnes is possible. The production of this apparatus is therefore comparable to that of a blast furnace with roughly the same hearth diameter.

Particular attention must be paid to the construction and design of the conical body 14. Since this must support the entire pellet column in the reducing column, it must be carefully supported on the foundation of the apparatus and it should preferably be cooled.

The calorific value of the top gas depends very much on the manner in which the apparatus is operated. For the example given above, however, this calorific value is assumed to be approximately 6.5 $MJ/Nm^3$. When this top gas is returned through elements 20, 21 and 22 the reducing gas is sufficiently cooled to enable the steam generation through steam pipes 13 and 15 to be almost dispensed with. However, allowance must be made for the fact that, when the apparatus is operated in this way, an increase in the available gas volume is not in itself necessary for operating the reduction column, since the extra output of reduced pellets achieved thereby cannot be melted in the melt vessel. This gas would therefore have to be fed into a separate directly reducing column, which is used for producing cold sponge iron, or a proportion of the sponge iron produced in the column 1 would have to be discharged to outside the apparatus, without being fed to the melt vessel. By operating in this manner a further 500 kg of sponge iron per tonne of pig iron can be produced while there is then obtained only a top gas quantity of calorific content 4 GJ. In this example the total consumption of raw materials will therefore be as follows:

2425 kg of basic pellets
640 kg of anthracite
440 $Nm^3$ of oxygen

The following products are obtained from these:

1000 kg Fe in the form of pig iron
500 kg Fe in the form of sponge iron
200 kg of gas with a calorific content of 4 GJ.

If this last quantity of gas cannot be used elsewhere, it is of course feasible to reuse it for additional production of directly reduced pellets.

FIG. 2 shows how three oxygen supply lances 10a, 10b and 10c are inserted obliquely in the melt vessel, so that the oxygen gas jets transmit tangential stirring impulses to the bath. The lances are installed so that the bath is brought locally into intensive movement, but so that the bath movement is slight close to the wall 6. This means that the wall is not subject to much wear caused by the movement of the bath. The lances 10a, 10b and 10c are adjustable as to height and direction. They extend through sealed apertures into the vessel 5 and can be moved through the apertures longitudinally.

What is claimed is:

1. Method of producing liquid iron from iron oxide during passage of the iron oxide through a reduction column into a melt vessel, comprising the steps of
    (a) substantially converting the iron oxide to sponge iron by passing reducing gas containing CO, $H_2$, $CO_2$ and $H_2O$ through the iron oxide in the reduction column,
    (b) feeding the sponge iron from the reduction column into a melt vessel which is in open communication with the reduction column,
    (c) delivering pure oxygen-containing gas and carbonaceous material containing coal powder separately into the melt vessel above the level of the liquid iron bath therein thereby melting the sponge iron in the melt vessel by heat generated by reaction of substantially pure oxygen and coal powder which reaction provides said reducing gas,
    (d) stirring the liquid iron bath in the melt vessel during said melting step so as at least partly to keep it in motion,
    (e) adjusting, during operation, the level and/or direction of delivery of at least one of the oxygen and the coal powder into the melt vessel and also adjusting, during operation, the amount of stirring of the iron bath so as to control the ratio of CO and $CO_2$ in the said reducing gas produced by the said reaction, and
    (f) tapping the liquid iron off from the melt vessel.

2. Method according to claim 1 including delivering said oxygen into the melt vessel by a plurality of oxygen lances which direct their jets obliquely onto the surface of the liquid iron bath in such a way as to stir the bath by causing circulation of at least part of the bath.

3. Method according to claim 2 wherein three said oxygen lances are used, each being arranged to direct a jet with a tangential component of motion with respect to a central point of the bath.

4. Method according to claim 2 including adjusting the position of the delivery end of each oxygen lance in the longitudinal direction of the lance during operation.

5. Method according to claim 1 including treating top gas derived from the reduction column to remove at least partly the carbon dioxide therein and adding the top gas so treated at least partly to the reducing gas being fed to the reduction column.

6. Method according to claim 1 including, in addition to the delivery of said coal powder into the melt vessel, feeding coal powder into the reducing gas being fed into the reducing column to effect conversion of $CO_2$ and $H_2O$ in the reducing gas into $CO$ and $H_2$ and thereby to effect a lowering of the temperature of the reducing gas.

* * * * *